(12) United States Patent
Olarig et al.

(10) Patent No.: US 8,386,727 B2
(45) Date of Patent: Feb. 26, 2013

(54) SUPPORTING INTERLEAVED READ/WRITE OPERATIONS FROM/TO MULTIPLE TARGET DEVICES

(75) Inventors: Sompong Paul Olarig, Pleasanton, CA (US); Pamela M. Cook, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2404 days.

(21) Appl. No.: 10/039,010

(22) Filed: Dec. 31, 2001
(Under 37 CFR 1.47)

(65) Prior Publication Data
US 2003/0126343 A1   Jul. 3, 2003

(51) Int. Cl.
*G06F 12/00* (2006.01)
*G06F 12/14* (2006.01)
*G06F 13/00* (2006.01)
*G06F 13/28* (2006.01)

(52) U.S. Cl. . 711/157; 711/141; 711/154; 711/E12.079; 710/306

(58) Field of Classification Search ............... 710/3, 12, 710/4, 114, 157, 162, 168, 110, 8, 100, 128, 710/107, 305; 711/4, 114, 157, 162, 168, 711/170; 709/245; 712/206; 365/189.04
See application file for complete search history.

(56) References Cited

U.S. PATENT DOCUMENTS

| | | | | |
|---|---|---|---|---|
| 5,365,468 A | * | 11/1994 | Kakubo et al. | 708/313 |
| 5,613,119 A | * | 3/1997 | France et al. | 713/1 |
| 5,623,664 A | * | 4/1997 | Calvert et al. | 713/1 |
| 5,696,913 A | * | 12/1997 | Gove et al. | 710/317 |
| 5,737,575 A | * | 4/1998 | Blaner | 711/164 |
| 5,761,726 A | * | 6/1998 | Guttag et al. | 711/147 |
| 5,864,712 A | * | 1/1999 | Carmichael et al. | 710/20 |
| 5,895,480 A | * | 4/1999 | Yung et al. | 711/5 |
| 6,230,225 B1 | * | 5/2001 | Olarig et al. | 710/306 |
| 6,272,577 B1 | * | 8/2001 | Leung et al. | 710/110 |
| 6,405,286 B2 | * | 6/2002 | Gupta et al. | 711/127 |
| 6,801,991 B2 | * | 10/2004 | Moller et al. | 711/173 |

OTHER PUBLICATIONS

"Interleaved memory," WEBOPEDIA, http://www.webopedia.com/TERM/I/interleaved_memory.html, 2 pages (Feb. 8, 1997).
"Disk striping," WEBOPEDIA, http://www.webopedia.com/TERM/d/disk_striping.html, 3 pages (May 15, 1998).
"Cache," WEBOPEDIA, http://www.webopedia.com/TERM/c/cache.html, 3 pages (Nov. 25, 1997).
"Shared memory," http://www.maths.uq.edu.au/~rbs/sgi/node6.html, 1 page (undated, last visited Nov. 29, 2001).
"What is Interleaved Memory?," http://www.macspeedzone.com/Comparison/WhatisInterleaved.html, (undated, last visited Nov. 29, 2001).
Lin, Hua, "Co-Design of Interleaved Memory Systems," Proceedings of The Eighth International Workshop on Hardware/Software Codesign, 5 pages (May 2000).

* cited by examiner

*Primary Examiner* — Mardochee Chery

(57) ABSTRACT

Bus transactions in a computer network are improved by utilizing a multicast transaction from a single initiator to multiple targets. The multiple targets simultaneously execute the transaction and provide a return transaction to the initiator. The transaction cycle time is reduced as individual request to each target is replace with a single request to a collective target group, addressable by a single base memory address. Interleaved read or write operation is provided to allow the multiple targets of a particular target group to independently execute a portion of the transaction request. Improved bus performance is achieve by utilizing the higher throughput capacity of the system bus providing a higher number of shorter data segments from each target executing its portion of the larger transaction.

40 Claims, 6 Drawing Sheets

SUPPORTING INTERLEAVED READ/WRITE OPERATIONS FROM/TO MULTIPLE TARGET DEVICES

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to read/write transactions on a computer bus and more particularly, but not by way of limitation, to a method and apparatus for supporting interleaved read/write operations for multiple target devices in a multicast computer environment.

2. Description of the Related Art

A conventional computer system typically includes one or more Central Processing Units (CPUs) capable of executing algorithms forming applications in a computer main memory. Peripheral devices, both those embedded together with a CPU or constructed to be separate therefrom, also typically form portions of a conventional computer system. Computer peripheral devices include, for instance, video graphics adapters, Local Area Network (LAN) interfaces, Small Computer System Interface (SCSI) bus adapters, and mass storage devices, such as disk drive assemblies.

A computer system further typically includes computer buses which permit communication of data between various portions of the computer system. For example, a host bus, a memory bus, at least one high-speed bus, a local peripheral expansion bus, and one or more additional peripheral buses form portions of a typical computer system.

A peripheral bus is formed, for instance, of an SCSI bus, an Extension to Industry Standard Architecture (EISA) bus, an Industry Standard Architecture (ISA) bus, or a Peripheral Component Interface (PCI) bus. The peripheral bus forms a communication path to and from a peripheral device connected thereto. The computer system CPU, or a plurality of CPUs in a multi-processor system, communicates with a computer peripheral device by way of a computer bus, such as one or more of the computer buses noted above.

A computer peripheral, depending upon its data transfer speed requirements, is connected to an appropriate peripheral bus, typically by way of a bus bridge that detects required actions, arbitrates, and translates both data and addresses between the various buses.

Software drivers are typically required for each computer peripheral device to effectuate its operation. A software driver must be specifically tailored to operate in conjunction with the particular operating system operating on the computer. A multiplicity of software drivers might have to be created for a single computer peripheral to ensure that a computer peripheral device is operable together with any of the different operating systems.

The complexity resulting from such a requirement has led, at least in part, to the development of an Intelligent Input/Output ($I_2O$) standard specification. The $I_2O$ standard specification sets forth, inter alia, standards for an I/O device driver architecture that is independent of both the specific peripheral device being controlled and the operating system of the computer system to which the device driver is to be installed.

Regardless of which bus protocol is deployed in a computer system or whether the computer system is $I_2O$ compliant, devices frequently employ bus master/slave functionality to communicate across a computer system bus. In a typical bus transaction, a single bus master sends information, including, but not limited to, address, data and control information to a single target device operating as a slave during a single bus transaction. In certain situations, however, it is desirable to broadcast the information to multiple targets. For example, in a fault-tolerant environment it is desirable to perform fast backup of data such as by providing mirrored disk drives. Conventional methods for sending information to multiple targets requires moving the information multiple times using multiple bus transactions. Specifically, with respect to $I_2O$ compliant systems, this process is particularly inefficient due to well known $I_2O$ compliant communication protocol causing significantly longer latencies.

Commonly assigned U.S. Pat. No. 6,230,225 proposes a technique which would effectuate low-latency distribution of data to multiple target devices. It further proposes a technique for multicasting on a computer system bus wherein information from a single bus master is broadcast to multiple targets during a single bus transaction.

Other advances have been made to improve efficiencies for execution of memory bus operations, for example disk striping and partitioned memory. Disk striping is a technique for spreading data over multiple disk drives. The computer system breaks a body of data into units and spreads these units across the available disks. A different approach has been to provide partitioned memory where the data in memory is divided into multiple sections. Partitioned memory results in an entire physical address spacing divided into groups of fixed sizes. Each of partitioned memory is independent from each other such that each partitioned segment is accessed one at a time. Alternatively, the data contained in memory has been arranged in particular ways, such as in a non-contiguous manner, to increase performance. Interleaved memory is a means of accessing memory where the requesting device can access, for example, alternate memory sections or separate data segments immediately, without waiting for memory to catch up (for example, through wait states). Within a partitioned memory, memory devices can be interleaved to improve the memory performance. The processor can access alternate sections immediately. Interleaved memory is one approach for compensating for the relatively slow speed of dynamic RAM (DRAM). Other techniques included page-mode memory and memory caches.

SUMMARY OF THE INVENTION

The computer system provides improved performance for data operations, particularly optimized for RAID storage. An initiator device initiates an interleaved data read or write operation as a single request to multiple target devices. The target devices are grouped together during system configuration to collectively recognize a shared base address from the data read or write command. Further, each target device of the collective target group is assigned during system configuration a particular portion of data storage against which data operations are executed. The collective group of target devices then responds to the single issued data operation in a manner where each target device of the collective target group simultaneously executes the data request only to the specific data location assigned to the target device. Wait states or the response times are reduced by reducing the number of requests required to address multiple targets. Likewise, interleaved data requests increase system efficiency by allowing the multiple targets to simultaneously access different portions of memory in response to the issued request.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

The following patent and applications are incorporated herein in their entirety by reference:

U.S. patent application entitled "Method and Apparatus for Eliminating the Software Generated Door Bell," by Sompong P. Olarig and Thomas J. Bonola, filed concurrently herewith;

U.S. patent application Ser. No. 09/735,267 entitled "Different Buses in a Computer System," by Sompong P. Olarig, Thomas J. Bonola and Ramakrishna Anne, filed Dec. 12, 2000; and U.S. Pat. No. 6,230,225 B1, entitled "Method and Apparatus for Multicasting on a Bus," by Sompong P. Olarig and Thomas J. Bonola, granted May 8, 2001.

The illustrative system described in this patent application provides a technique for improved system efficiency for data read and write operations in a system containing multiple target devices. For purposes of explanation, specific embodiments are set forth to provide a thorough understanding of the illustrative system. However, it would be understood by one skilled in the art, from reading the disclosure, that the technique may be practiced without these details. The use of the terms PCI, PCI target device and SCSI and SCSI controllers to illustrate how the system works is not intended to infer that the illustrative system requires a specific type of communication architecture or specific type of memory architecture. Rather, any of a variety of memory architectures and communication platforms may be employed in practicing the technique described herein. Moreover, well known elements, devices, process steps, and the like, are not set forth in detail in order to avoid obscuring the disclosed system.

Figure 1:
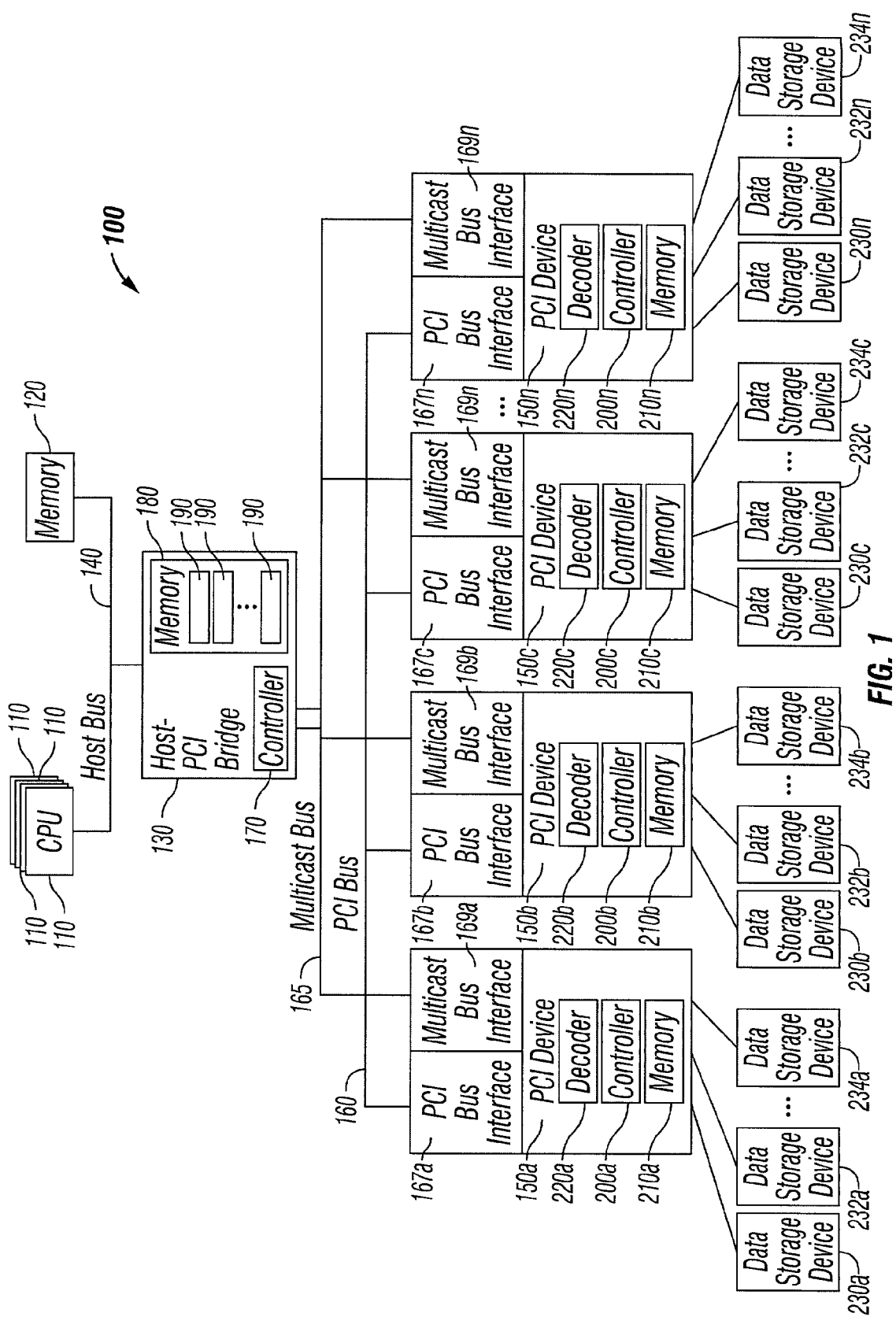
FIG. 1 is a functional block diagram of an apparatus for effectuating multicasting on a computer system bus.

Referring now to FIG. 1, there is illustrated a functional block diagram of an apparatus, shown generally at 100, for effectuating multicasting operations for interleaved data storage on a computer system bus. A plurality of host CPUs 110, a host memory 120, a host-to-PCI bridge 130 and other devices (not shown) typically associated with a host computer system communicate with one another across a host bus 140. The host to PCI bridge 130 and a plurality of PCI devices 150A-N communicate with one another across a PCI bus 160. The PCI devices 150A-N can be located on a mother board together with the host CPUs 110 or can be located off of the mother board separate from the host CPUs 110. Communications between devices on the host bus 140 and devices on the PCI bus 160 is effectuated via the host to PCI bridge 130 in a manner well known in the industry. Furthermore, as will be described in greater detail, information is broadcast from devices on the host bus 140, for example the host CPU 110, to multiple PCI devices 150A-N across the PCI bus 160 via the host to PCI bridge 130 in conjunction with a multicast bus 165, discussed in greater detail with reference to U.S. Pat. No. 6,230,225 B1, incorporated above.

The host-to-PCI bridge 130 is controlled by a controller 170 and includes a memory 180 which among other things, contains a plurality of configuration registers 190 utilized, for example, to contain system initialization parameters, such as memory assignments discussed below, and communication protocol parameters, such base address settings also discussed below.

Each PCI device 150A-N includes a PCI bus interface 167A-N and a multicast bus interface 169A-N for interfacing to the PCI bus 160 and the multicast bus 165 respectively. Each PCI device 150A-N is controlled by an associated controller 200A-N and includes an associated memory 210A-N. Command information and target identification information communicated across the multicast bus 165 to the PCI devices 150A-N is decoded by the PCI devices 150A-N using an associated decoder 220A-N. Each PCI device 150A-150N is further coupled to one or more data storage devices 230A-234A, 230B-234B, 230C-234C and 230N-234N. Data operations from the CPU 110 for data to be read from or written to the data storage devices is performed through the PCI devices 150A-150N. The data storage devices are configured as memory apportioned among the PCI devices such that multiple PCI devices may simultaneously respond to interleaved data operations (discussed in more detail in connection with the figures below).

The multicast operation to multiple targets from a single initiator achieves savings by reducing the number of requests needed to address the targets. In addition, according to the disclosed subject matter, providing a single read from multiple targets improves performance by avoiding wait states and limits inefficiencies shifting data transfer operations from the executing device to the data bus. According to an embodiment, a SCSI application is one example. In a typical SCSI application, an initiating device issues a request to a SCSI controller via a PCI bus. The SCSI controller then initiates the proper SCSI bus phases to pass the request to the targeted device.

Typical SCSI disk drives only provide about 10 Mbytes per second throughput. A SCSI ULTRA-2 bus has a maximum throughput of 80 Mbytes per second and SCSI ULTRA-3 has a maximum of 160 MBps. A PCI bus running at 66 MHz/64 bits (528 MBps) can easily maintain activity on more than six SCSI buses. However, with disk drives, a significant amount of time is spent waiting for the physical device to respond to the request. Since the throughput of the SCSI bus (80 MBps) is so much higher that a SCSI (10 MBps) device, the present disclosure maximizes disk performance by increasing data transfer between the controller and the devices on the SCSI bus. This way more data is consistently ready to be placed on the PCI bus rather than waiting for individual requests of a particular SCSI device. Although, the transfer time for the SCSI disk drives may increase in certain situations, this latency will not overcome the savings due to the electrical speed of the SCSI bus.

Even applying present disk partitioning or striping technology, where a larger request to segmented memory is satisfied by multiple controllers, the throughput of the SCSI bus is still a limiting factor. According to the disclosed subject matter, a single application sends/receives data to and from several controllers. As such, the disk input/output transfer throughput increases for each additional controller.

Although a PCI environment is discussed as an exemplary embodiment of the disclosed subject matter, it should be understood that other bus protocols can be implemented according to known techniques without departing from the spirit of the invention. For example, although typically compatible with PCI in the first instance, a disk array system utilizing SCSI protocol can be implemented replacing the PCI bus and PCI devices with a SCSI bus and disk array controllers. Another embodiment includes communication to SCSI compatible controllers over the PCI bus itself. Furthermore, alternatives to a PCI environment includes other I/O bus architecture such as PCI-X, Infiniband, Fibre Channel and other networking interconnects such as GigaBit Ethernet. The method and apparatus disclosed herein is not dependent on a specific platform and other communication protocols and memory architectures may also benefit from the disclosed subject matter.

Figure 2A:
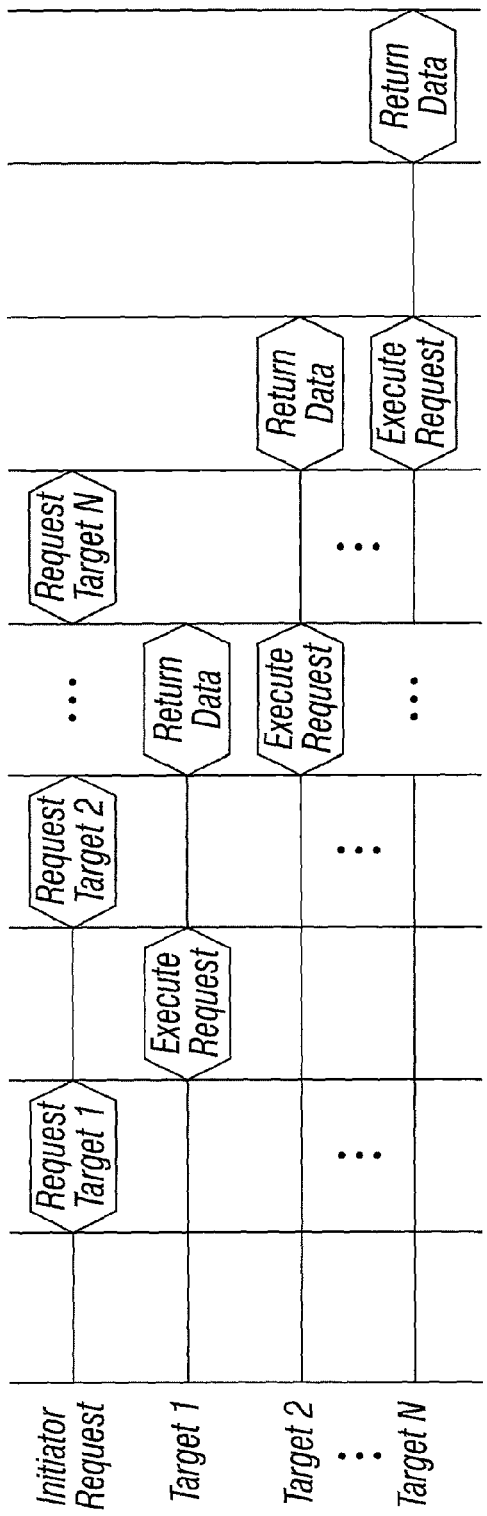
FIGS. 2A and 2B are timing diagrams for effectuating multicasting on a computer system bus consistent with the apparatus described in FIG. 1.
Figure 2B:
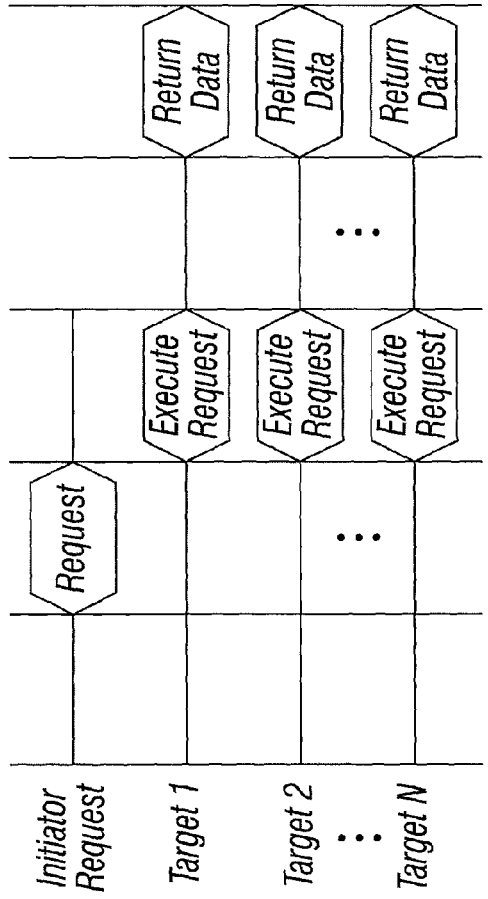

Turning to FIG. 2, shown are exemplary read requests utilizing multiple target devices comparing the savings in cycles of a multicast, interleaved read operation according to the disclosed subject matter, illustrated in FIG. 2B, and a read operation according to typical sequential addressing protocol, illustrated in FIG. 2A. In FIG. 2A, an initiator device issues a read request to be executed by multiple target devices. Each target device requires independent addressing, such that multiple reads are required by the initiator. This consumes valuable initiator device resources, when the initiator could be performing other tasks. Each target, in turn, must wait until that target device sees its address issued onto the bus. Once a target has been addressed, that target is then free to execute the read request to return the requested data. However, because multiple read requests are required, the target devices must respond in a sequential manner limited by the speed the initiator can issue the multiple requests and the availability of the bus to transmit the multiple sequential requests. In this way, bus resources are required to provide the transmission of the multiple requests. Finally, the time to return the data is extended due to the wait time seen by each subsequent target device.

In FIG. 2B, an initiator issues a single request which is seen by all of the targets of the collective target grouping as a request to each target to respond to the read. Specifically, each of the targets of the grouping is configured to recognize a single base address to address the collective target group. Because each target has been addressed with the single request, each target is able to simultaneously execute the request and return the data, subject to bus arbitration. Resources of both the initiator device and the bus is saved due to the single request and the overall return cycle time is reduced as wait states to the target devices are minimized.

Figure 3A:
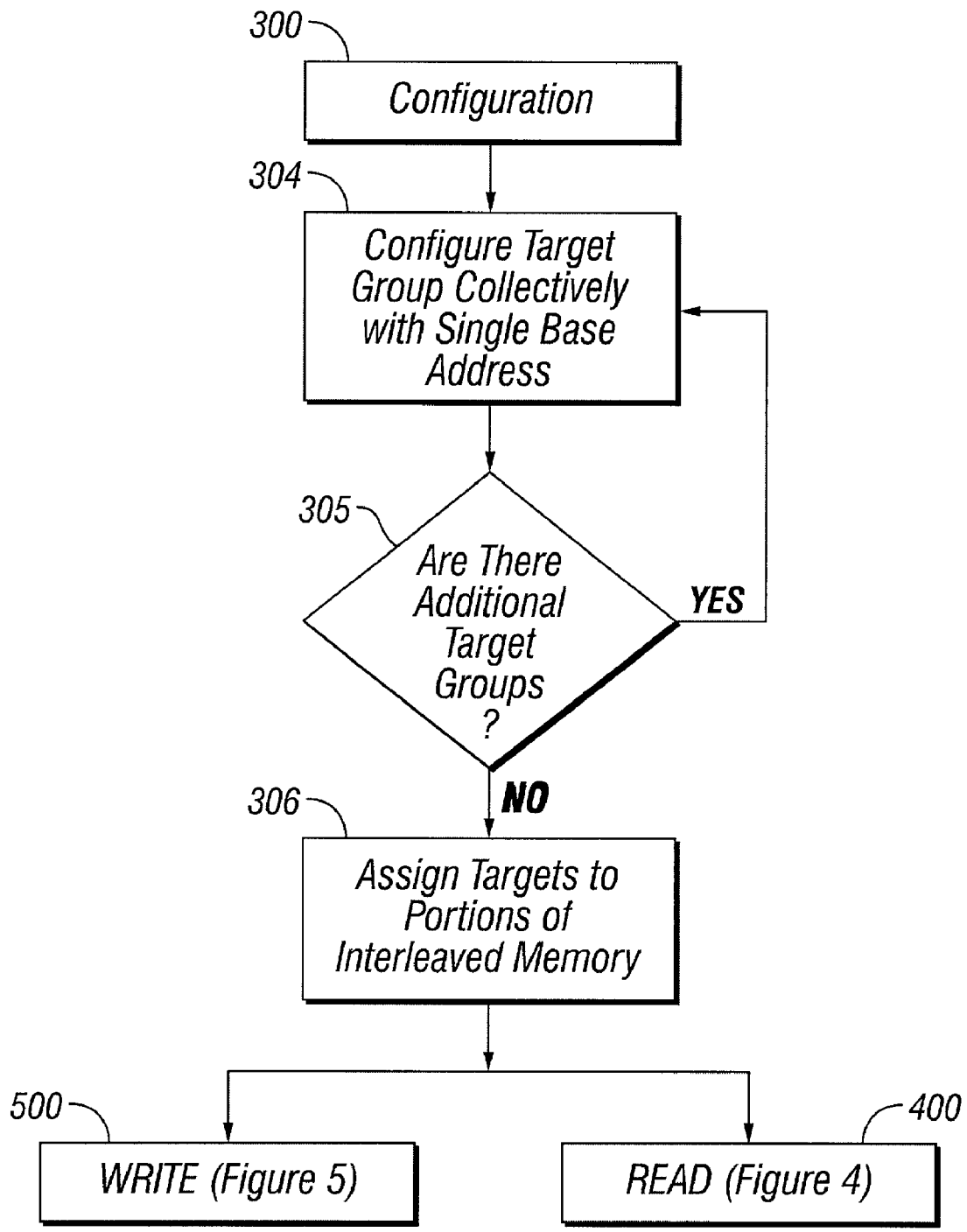
FIG. 3A is a flow diagram for configuring target devices consistent with the apparatus of FIG. 1.

Turning now to FIG. 3A, shown is a configuration protocol according to an embodiment of the disclosed subject matter. Configuration begins at step 300 where initialization of the system and specifically the PCI devices 150A-150N occurs. Although configuration may occur at anytime, including during communication processing, typically configuration is performed during power-up or before or during a plug and play sequence. According to an embodiment of the disclosed subject matter, configuration is performed by the BIOS or by the plug and play system software.

At step 304, target groups are collectively configured with a single base address. This allows a grouping of targets to recognize an initiator request with a single base address as a request to all of the target devices 150 included in the target group. A target device group may consist of any variation of device types or of number of devices. A consideration for target group configuration may include, for example, optimization of the amount or location of memory typically accessed by the system. For example, where it is known that certain portions of memory are more routinely accessed than others, a target group may be configured as dedicated to that portion of memory. Other target groupings may be more general in nature. Other considerations may be important in configuring a target grouping including the size of the logical memory blocks, the striping factor or the granularity of blocks among RAID devices, and the number of disks being utilized.

The process continues at step 305 where the system loops between 304 and 305 to configure all additional target groupings. The configuration process is performed according to known configuration protocols. The Extended System Configuration Data (ESCD) format, for example, is an industry standard for storage of both plug and play and non-plug and play device configuration. The ESCD format is used to store detailed configuration information in the NVRAM for each device to be configured. Configuration is performed for all devices coupled to the system at the first initialization. Peripheral devices subsequently added to the system are configured upon connection. Thus a running configuration is maintained so the configuration software tracks when further configuration is required.

Once all the target groups have been collectively configured to recognize a single base address request at step 306, the individual target devices 230A-230N, 232A-232N and 234A-234N are assigned portions of partitioned memory, discussed in more detail with reference to FIG. 5. According to one embodiment, step 306 includes associating a certain portion of memory with each target device of the collective target group. Once the target groups have been configured and the individual targets within the target groupings have been assigned portions of interleaved memory, configuration is complete and the system is ready to respond both to broadcast read operations 400 or broadcast write operations 500.

Figure 3B:
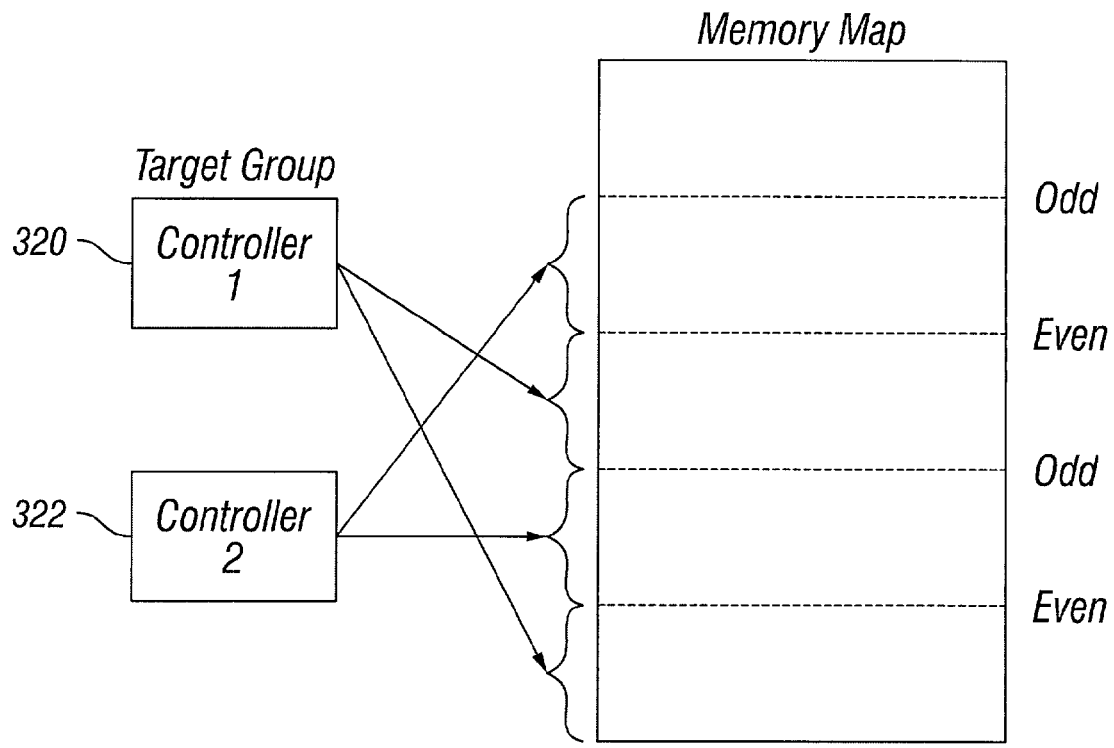
FIGS. 3B and 3C are memory maps illustrating target configuration for interleaved memory portions.
Figure 3C:
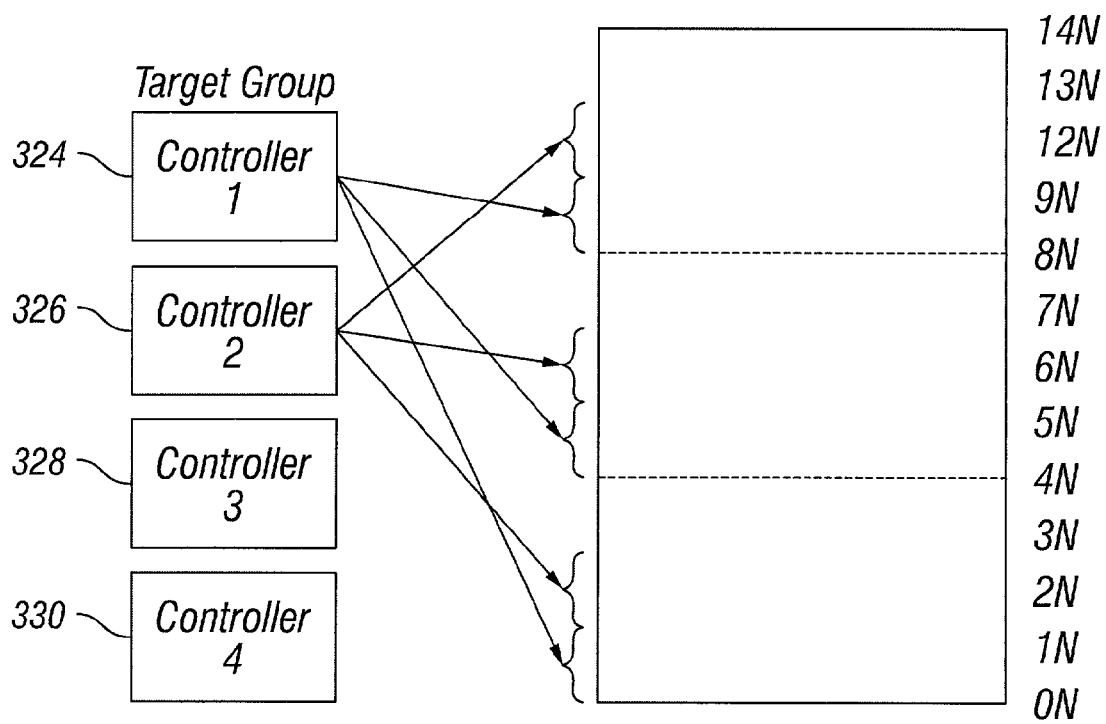

Turning now to FIGS. 3B and 3C, shown are exemplary configurations for interleaved memory. Specifically, portions of memory are preassigned during system configuration, or alternatively between cycles during normal system operation, to a specific target device. Furthermore, the assignment of memory portions are divided in any number of ways among the target devices in a particular target grouping. For example, in a target grouping of two target input/output controllers, 320 and 322 for example, one target device 320 might be assigned to respond to requests to even bytes or blocks of data in memory while the other target device 322 would be configured to respond to requests to odd bytes or blocks of memory. This interleaving of memory may be split among the collective target groups in any number of ways. For example, according to another embodiment, the target devices 324-330 of a collective target device grouping may be configured to respond to requests to every N bytes or blocks. The assignment of interleaved memory to specific target devices creates smaller blocks of memory for each data transaction allowing a target to access portions of requested data, for example in response to a read request, as part of a larger data request. The other target devices of the collective target device group access the remaining requested data simultaneously. Because, smaller portions are retrieved wait states are reduced or avoided. Specifically, because interleaved data operations can be performed concurrently with one another, or more particularly, one data request can be executed in simultaneous smaller portions, large amounts of data may be retrieved without waiting for memory to catch up with on larger request or multiple smaller sequential requests. Likewise, because multiple targets are retrieving data concurrently, the efficiencies due to reducing or avoiding wait states is realized and passed as an improvement to average storage access time and the overall data operation.

Figure 4:
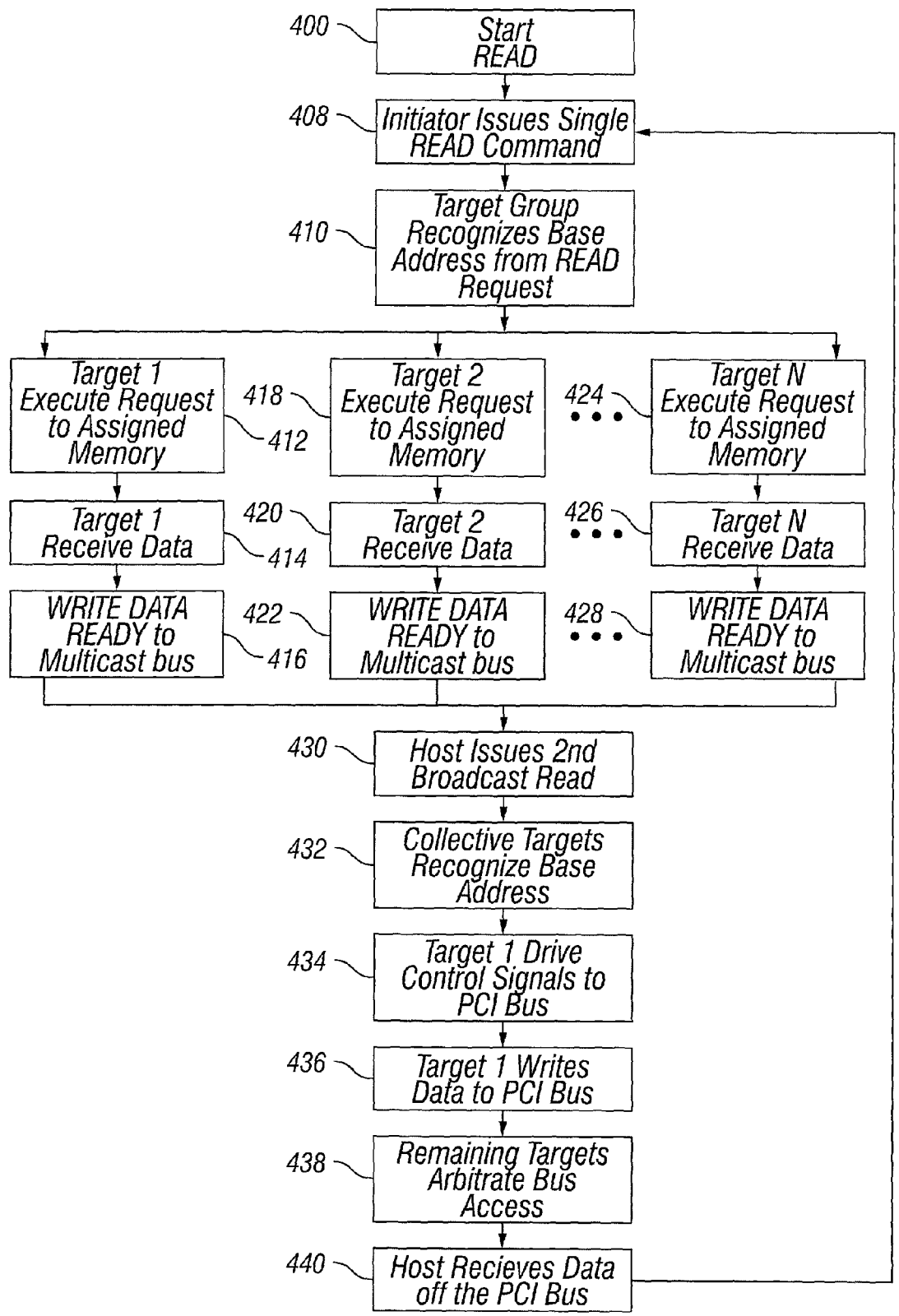
FIG. 4 is a flow diagram for effectuating multicasting on a computer system bus for interleaved READ operations from memory.

Turning now to FIG. 4, shown is a process for implementing a READ operation 400 according to an embodiment of the disclosed subject matter. Specifically at step 408, an initiating device issues a single READ command, for example, to request data from memory. At step 410, one or more of the collective target groups recognizes the base address within the READ request. Essentially, each target group listens to the entire request (at the same time) and only processes its own portion, as previously configured of the request. Thus, for example, target 1, target 2, to target N have been initially configured as part of a collective target group. Each of the targets within this particular target group processes only the part of the READ request for data stored within the portion of memory the specific target device had been previously assigned during configuration.

At step 412, target 1 executes the READ request by requesting data from memory within the portion of memory previously assigned to target 1. Similarly, target 2 executes the read request to its assigned portion of memory. This continues until at step 424 all of the targets of the addressed target group have executed the read request to their assigned portions of memory at step 424.

This interleaved memory read approach allows each of the targets to respond to requests for smaller data and do so simultaneously. Thus, steps 412, 416, up to 424 occur concurrently for all targets configured within the target group. At steps 414, 420, and 426, each of the target controllers receives the requested data. At steps 416, 422, and 428, each target writes to the multicast bus a signal indicating data is ready for transmission. Target writes to the multicast bus is more fully discussed in U.S. patent application entitled "Method and Apparatus for Eliminating the Software Generated Door Bell," U.S. patent application Ser. No. 09/735,267 and U.S. Pat. No. 6,230,225 B1, above incorporated by reference.

In conventional systems, a read to multiple target devices required issue of multiple sequential reads requests to each target device being communicated. The disclosed multicast system allows for multiple controllers to respond to smaller portions of a read request and interleaved memory allows the multiple controllers to respond simultaneously.

Continuing at step 430, after each target device concludes execution of its portion of the read request, the host issues a second broadcast READ over the PCI bus 160. At step 432, the collective target group recognizes the base address of this second broadcast READ. Target 1 responds to the second broadcast READ at step 434 by driving control signals to the PCI bus, according to known PCI methods, indicating data is ready for transmission. At step 436, target 1 writes data onto the PCI bus, followed by the remaining data from each of the remaining targets at step 438 as they arbitrate for bus access. At step 440, the host receives data off of the PCI bus as it is placed onto the PCI bus. Control then returns back to beginning to wait for a subsequent request from the host.

According to an alternative embodiment, the group of target controllers can participate in a MIST WRITE operation, as known in the art, back to the original requester. Specifically, as each target controller receives the requested data, it notifies the first target controller in the collective group. That first target controller waits until all the controllers in the collective group have sent notification data has been received. The first target controller initiates a PCI MIST WRITE to a specific address according to known methods. Each target of the collective group recognizes the MIST WRITE command with the address of the specified initiator device and knows it has data for this address. The targets arbitrate for the PCI bus driving the address and data lines when it is time to place data on the bus. The first target controller of the collective controllers then releases the PCI control lines when the transaction is complete and the host has received all of the data. Here again, the efficiencies resulting from both a broadcast READ request allowing multiple target controllers to read smaller segments of data along with the simultaneous execution of the read requests by multiple controllers to interleaved memory results in shorter cycle time thereby improving overall system performance.

Figure 5:
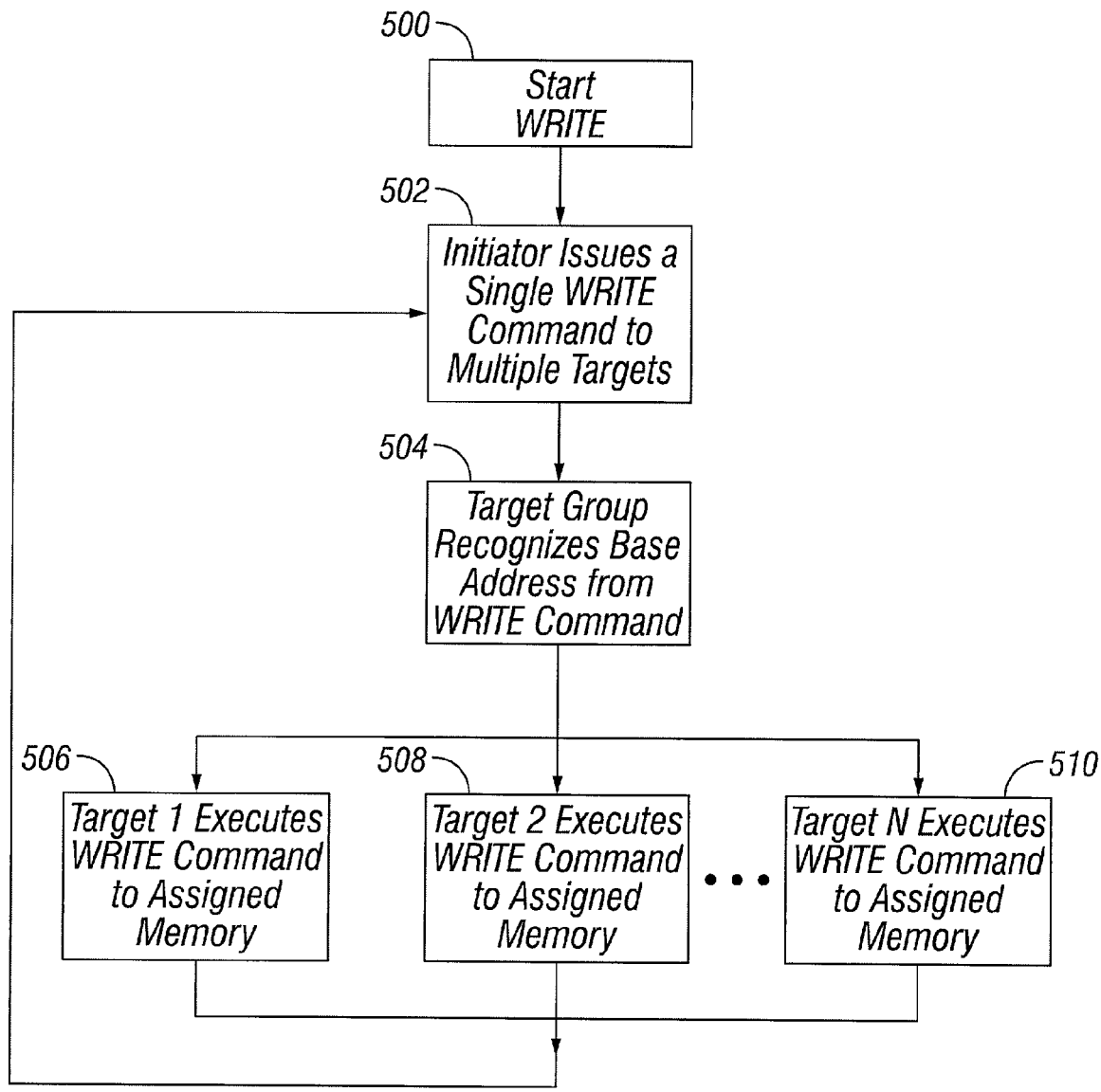
FIG. 5 is a flow diagram for effectuation multicasting on a computer system bus for interleaved WRITE operations to memory.

Turning now to FIG. 5, shown is an exemplary WRITE operation according to one embodiment of the disclosed subject matter. Specifically, at step 502, an initiator issues a single WRITE command to multiple targets. At step 504, much like during a READ operation, a target group recognizes the base address from the WRITE command. This target group is defined during the configuration as discussed above with reference to FIG. 3. The collective controllers recognize the base address from the WRITE command and start listening and buffering respective data according to the interleaved memory assignment configuration. Each controller then initiates the WRITE request to the peripheral or input/output devices, for example, memory devices such as SCSI disk drives.

At steps 506, 508 and 510, target 1, target 2, to target N of the collective target group executes the WRITE command by sending data to the assigned portion of memory. Control then returns to step 502 where the system waits idle until another command is issued. Thus, similar to the READ operation, the multicast WRITE broadcast provides for multiple target devices to execute smaller portions of data and allowing these multiple target devices to WRITE the data to memory in a simultaneous fashion according to the interleaved memory assignments set during configuration.

Thus, a process is achieved whereby increased system efficiency and speed is achieved as multiple target devices or controllers execute portions of a larger READ or WRITE command. Since this is accomplished with a single transaction instead of multiple sequential transactions, the command cycle time is reduced. Improved system speed is achieved by increasing data transfer between the controllers and memory devices thereby presenting data to the host bus, having a much higher throughput capability, more frequently. Furthermore, memory is apportioned among the target devices responsible for responding to the requests to allow the request to be broken into smaller data segments. Thus, an improvement over typical multicast is achieved by allowing each target or controller device of the configured target group to execute different portions of the request independent of and simultaneous with the other targets of the collective group executing the remainder portion of the request. As additional controllers are configured as part of a larger collective controller group, throughput increases without limitation by the throughput of the host bus.

The foregoing disclosure and description of the various embodiments are illustrative and explanatory thereof, and various changes in the type or memory, descriptions of the microcontroller, the target controllers, the host bridge, the memory devices, and other circuitry, the organization of the components, and the order and timing of steps taken, as well as in the details of the illustrated system may be made without departing from the spirit of the invention.

We claim:

1. A method for transacting between an initiator device and a plurality of target devices, the method comprising:
    associating each of the plurality of target devices with a single base address, wherein the same single base address is associated with each of the plurality of target devices;
    sending a multicast transaction from the initiator device to the plurality of target devices, wherein sending the multicast transaction comprises sending a multicast transaction to the single base address associated with each of the plurality of target devices; and
    executing the transaction when the transaction is received by the plurality of target devices according to the configuration of the target devices.

2. The method of claim 1, wherein the associating each of the plurality of target devices comprises:
    assigning a base memory address to be shared by the plurality of target devices; and
    assigning a first portion of memory to a first target device of the plurality of target devices.

3. The method of claim 2, wherein the transaction is a read request for a block of stored data from memory, comprising:
    recognizing the base memory address from the read request;
    initiating a read operation by the plurality of target devices assigned to the base memory address;
    fetching stored data from a portion of memory associated with each of the target devices, the data being concurrently fetched by each associated target device; and
    sending the fetched data to the initiator device.

4. The method of claim 2, wherein the transaction is a write request for data to be stored in memory, comprising:
    recognizing the base memory address from the write request;
    initiating a write operation by the plurality of target devices assigned to the base memory address; and
    writing data of the write request to a portion of memory associated with each target device, the data being concurrently written by each associated target device.

5. The method of claim 1, wherein the target devices comprise input/output controllers.

6. The method of claim 1, wherein the target devices comprise disk array controllers.

7. The method of claim 1, comprising a plurality of target groups.

8. The method of claim 1, wherein sending the multicast transaction comprises sending the multicast transaction from a disk drive controller to a plurality of disk drives.

9. The method of claim 1, wherein sending the multicast transaction comprises sending the multicast transaction from a SCSI controller to a plurality of SCSI devices.

10. A method for transacting data stored in memory between an initiator device and multiple target devices, the method comprising:
    detecting a multicast transaction request;
    accessing a first portion of memory by a first target device in response to the multicast transaction request; and
    accessing a second portion of memory by a second target device concurrently with the access to the first portion of memory in response to the multicast transaction request, wherein the first and second portions of memory are accessed with a single base address associated with both the first target device and the second target device, wherein the first target device and the second target device are associated with the same single base address.

11. The method of claim 10, wherein the target devices comprise input/output controllers.

12. The method of claim 10, wherein the target devices comprise disk array controllers.

13. The method of claim 10, comprising accessing a plurality of target devices, wherein the plurality of target devices are divided into a plurality of groups, wherein each of the plurality of groups is associated with a single base memory address configured to address the target devices within that group.

14. A computer system comprising:
    a bus;
    an initiator device coupled to the bus, the initiator device configured to initiate a transaction request; and
    a plurality of target devices coupled to the bus, wherein each of the plurality of target devices concurrently executes a portion of the transaction request, wherein the initiator device is configured to multicast the transaction request to the plurality of target devices using a single base address associated with the plurality of target devices, wherein the same single base address is associated with each of the plurality of target devices.

15. The computer system of claim 14, wherein the plurality of target devices comprise input/output controllers.

16. The computer system of claim 14, wherein the plurality of target devices comprise disk array controllers.

17. The computer system of claim 14, wherein the plurality of target devices comprise a target group.

18. The computer system of claim 17, comprising a plurality of target groups.

19. The method of claim 14, wherein the transaction is a multicast read request.

20. The method of claim 14, wherein the transaction is a multicast write request.

21. The computer system of claim 14, wherein the bus comprises a Peripheral Component Interconnect (PCI) bus.

22. The computer system of claim 14, wherein the initiator device comprises a SCSI controller.

23. The computer system of claim 14, wherein the plurality of target devices comprises a plurality of disk drives.

24. A computer system comprising:
    a processor;
    a bus coupled to the processor;
    an initiator device coupled to the bus, the initiator device configured to issue a multicast transaction; and
    a plurality of target devices coupled to the bus, the plurality of target devices configured to execute the multicast transaction with concurrent data responses from a plurality of interleaved memory regions, wherein the initiator device is configured to multicast the transaction request to the plurality of target devices using a single base address associated with the plurality of target devices, wherein the same single base address is associated with each of the plurality of target devices.

25. The computer system of claim 24, wherein the target devices comprise input/output controllers.

26. The computer system of claim 24, wherein the target devices comprise disk array controllers.

27. The computer system of claim 24, wherein the plurality of target devices are divided into a plurality of target groups, wherein each of the target groups is associated with its own base address.

28. The computer system of claim 24, wherein the initiator device comprises a SCSI controller.

29. The computer system of claim 24, wherein the plurality of target devices comprises a plurality of SCSI hard drives.

30. A computer comprising:
a memory;
a controller configured to logically divide the memory into a plurality of interleaved memory regions; and
a plurality of devices having a common base address, wherein each of the plurality of devices is associated with one of the interleaved memory regions and wherein each of the devices simultaneously accesses its associated interleaved memory region in response to a single transaction request directed to the common base address.

31. The computer of claim 30, wherein the controller comprises a SCSI controller.

32. The computer of claim 30, wherein the plurality of devices comprises a plurality of SCSI hard drives.

33. A method comprising:
dividing a section of memory into a plurality of interleaved memory regions;
associating the plurality of interleaved memory regions with a plurality of target devices;
associating the plurality of target devices with a single base memory address, wherein the same single base memory address is associated with each of the plurality of target devices; and
executing a memory access using the single base memory address.

34. The method of claim 33, wherein executing the memory access comprises executing a read operation.

35. The method of claim 33, wherein executing the memory access comprises executing a write operation.

36. A tangible machine readable medium comprising:
code to initialize a plurality of devices;
code to configure the plurality of devices to associate a single base address with the plurality of devices, wherein the same single base address is associated with each of the plurality of devices; and
code to associate the single base address with a plurality of interleaved memory regions, wherein the same single base address is associated with each of the plurality of interleaved memory regions.

37. The tangible medium of claim 36, comprising:
code to issue a single read command comprising the single base address;
code to recognize the single base address as associated with the plurality of devices;
code to simultaneously execute a plurality of memory requests involving the plurality of devices;
code to receive data from the plurality of devices; and
code to write the received data to a bus.

38. The tangible medium of claim 36, comprising:
code to issue a write command comprising the single base address;
code to recognize the base address as associated with the plurality of devices; and
code to simultaneously write to the plurality of devices.

39. A method for performing operations accessing memory comprising:
assigning a common base address to a plurality of disk drives to create a collective target group;
assigning a portion of data storage to each disk drive of the collective target group; and
initiating an interleaved memory operation as a single request to the collective target group using the common base address, wherein each disk drive recognizes the common base address and simultaneously executes the memory operation on the portion of data storage to which the disk drive is assigned.

40. The method of claim 39, wherein initiating an interleaved memory operation as a single request comprises initiating a multicast transaction from a SCUSI controller over a multicast bus.

* * * * *

UNITED STATES PATENT AND TRADEMARK OFFICE
CERTIFICATE OF CORRECTION

| | |
|---|---|
| PATENT NO. | : 8,386,727 B2 |
| APPLICATION NO. | : 10/039010 |
| DATED | : February 26, 2013 |
| INVENTOR(S) | : Sompong Paul Olarig et al. |

It is certified that error appears in the above-identified patent and that said Letters Patent is hereby corrected as shown below:

In the Claims:

In column 10, line 40, in Claim 19, delete "method" and insert -- computer system --, therefor.

In column 10, line 42, in Claim 20, delete "method" and insert -- computer system --, therefor.

Signed and Sealed this
Twenty-eighth Day of May, 2013

Teresa Stanek Rea
*Acting Director of the United States Patent and Trademark Office*